Patented Mar. 14, 1944

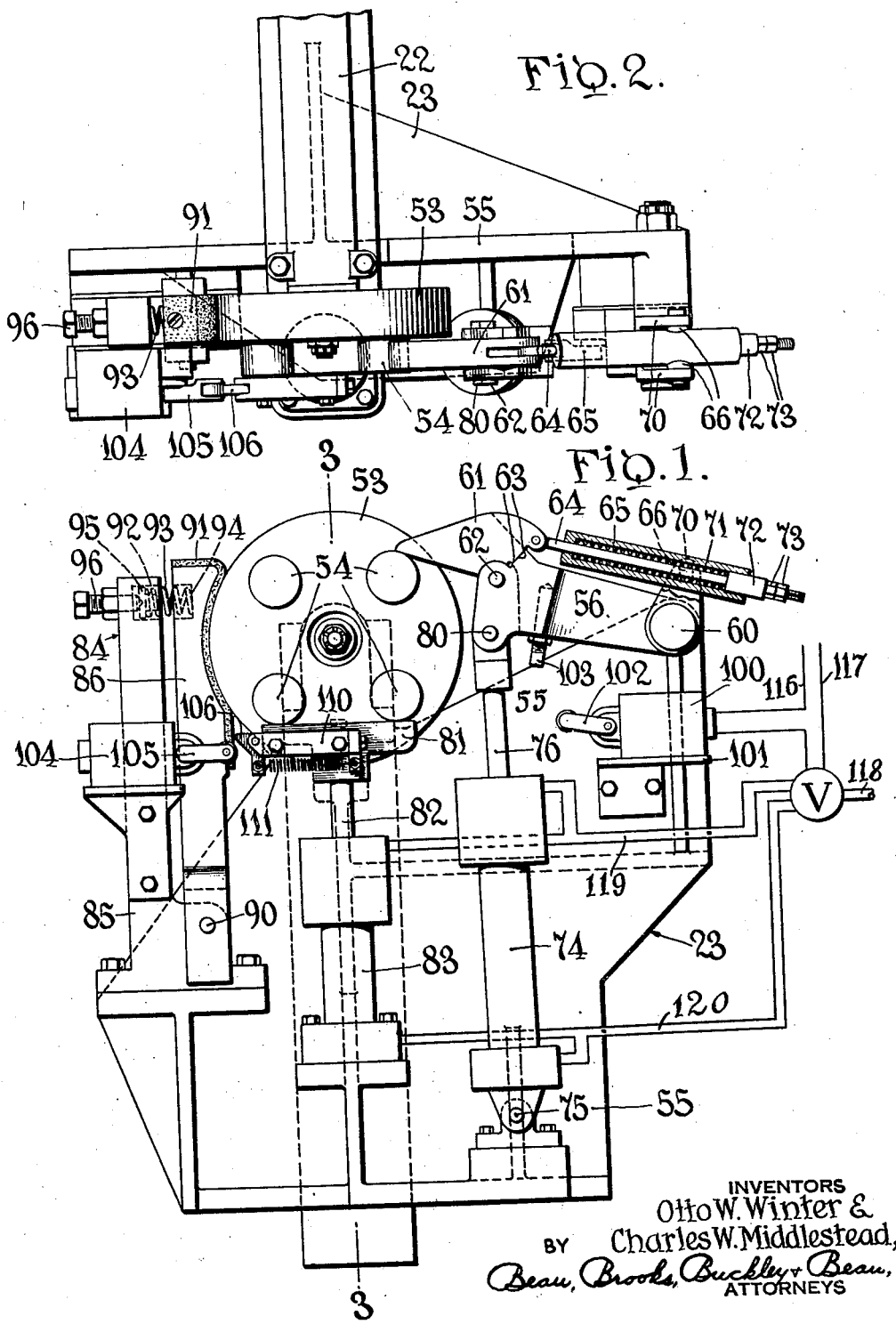

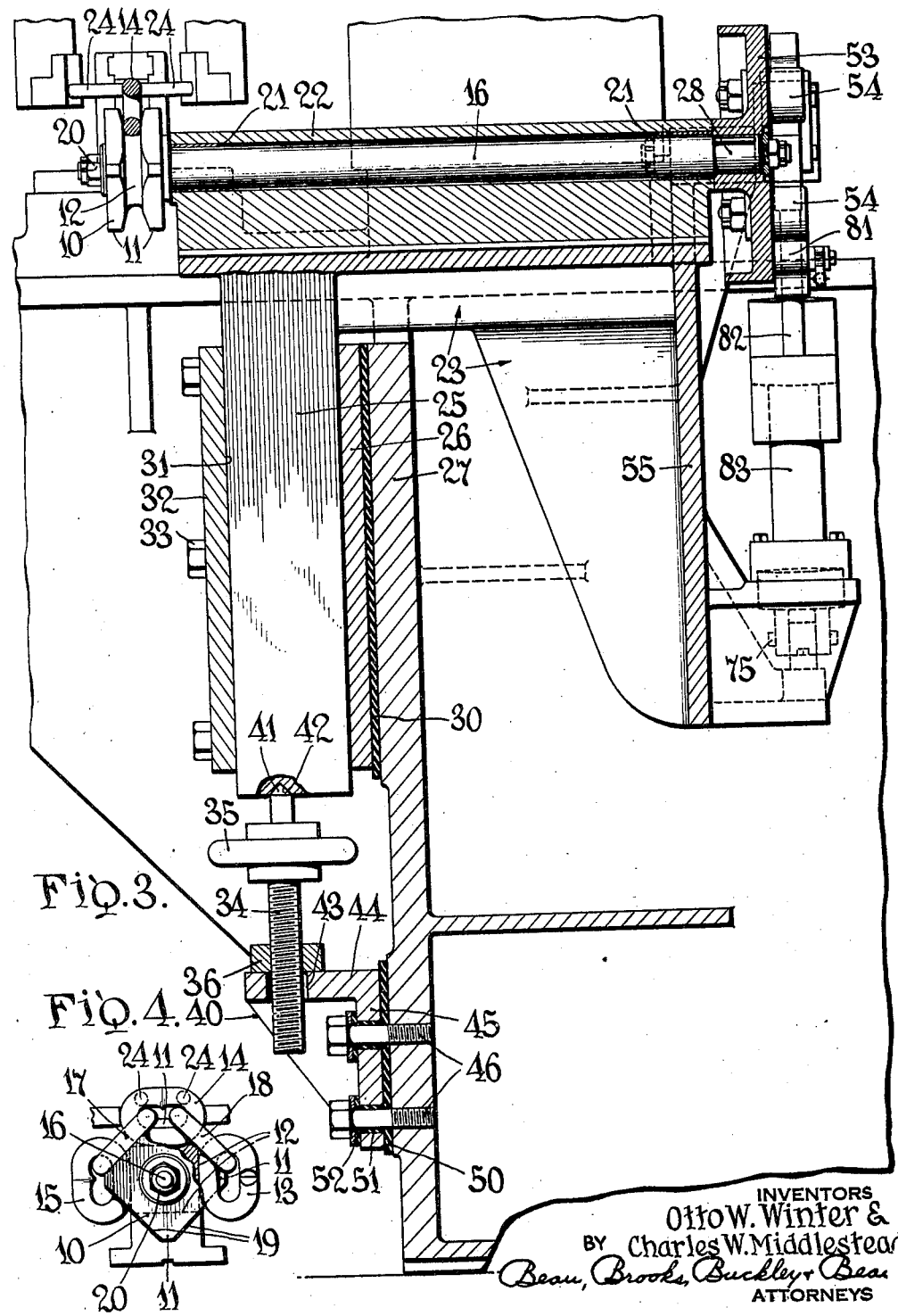

2,344,435

UNITED STATES PATENT OFFICE 2,344,435

INDEX MEANS FOR CHAIN WELDING MACHINES

Otto W. Winter, Grand Island, N. Y., and Charles W. Middlestead, Warren, Ohio, assignors to Columbus McKinnon Chain Corporation, Tonawanda, N. Y., a corporation of New York Application December 3, 1941, Serial No. 421,478

11 Claims. (Cl. 74—142)

Our invention relates in general to index means for welding machines, and particularly to means for operating the chain feed wheel or sprocket for causing chain links to be advanced one at a time to the welding position.

One of the principal objects of our invention has been to provide an index mechanism which shall be operated by hydraulic means.

Another object has been to provide means for accurately determining the final position of the feed wheel.

Moreover, the determining means of our invention also serve to lock the feed wheel in position while supporting the link during the welding period.

Furthermore, by providing hydraulically actuated feed means, it is possible to change the speed of actuation of the feed wheel at will, irrespective of the speed of operation of the other parts of the machine.

Moreover, it has been an object to provide actuating means and locking means for the feed wheel which are not only flexible but certain and positive in operation.

Another object of our invention has been to provide an index brake which shall frictionally retard movement of the index disc, holding it in place while the locking means is being brought to operative position.

The above objects and advantages have been accomplished by the device shown in the accompanying drawings, of which:

Fig. 1 is a rear elevation of our invention;

Fig. 2 is a fragmentary plan view of the same;

Fig. 3 is a side sectional elevation of our device taken on line III—III of Fig. 1 showing the device attached to the frame of the welding machine with which it is used; and Fig. 4 is a fragmentary front view showing the feed wheel.

Our invention comprises the usual feed wheel 10 which is, as is customary, polygonal or four-sided in shape having flat exterior surfaces 19. In each corner 11 of the wheel a groove 12 is formed for the reception of the alternate chain links 13, 14 and 15. The chain link 14 is being held by the wheel in welding position; the link 13 is ready to be fed to said welding position upon operation of the feed wheel; and the link 15 has already been welded. As is customary in chain welding machines each alternate link is successively welded each time the chain is run through the machine and the links 13, 14 and 15 are connected by the links 17 and 18, supported by the surfaces 19 of the wheel.

This feed wheel 10 is mounted upon a shaft 16 and is preferably held thereon by means of a nut 20. The wheel may easily be replaced by a different one so as to adapt the machine to which the invention is applied to the welding of different size links.

The shaft 16 is rotatably mounted in suitable bearings 21 carried by the sleeve 22 of an index bracket 23. This bracket is movable vertically so as to properly adjust the link being supported by the wheel at the right position in relation to the welding electrodes 24. To this end the bracket is provided with an adjusting slide 25 arranged preferably at right angles to the sleeve 22 and depending therefrom. This slide is preferably polygonal in cross-section, and is mounted within a slide housing 26 carried by the frame 27 of the machine. The housing is insulated from the frame by means of an insulator 30. The slide housing is provided with a slideway 31 which is closed by means of a cover plate 32, held in place by means of bolts 33.

So as to provide for accurate and sensitive vertical adjustment of the feed wheel 10, an adjusting screw 34 is provided having a hand wheel 35 attached thereto. The screw is screwthreaded into an adjusting screw plate 36 which is carried by an adjusting screw bracket 40, suitably secured to the frame 27 of the machine directly beneath the slide 25. The screw may be formed at its upper end with a conical point 41 which fits into a suitable tapered recess 42 formed in the lower end of the slide 25. The screw 34 passes through an aperture 43 formed in the horizontal leg 44 of the screw bracket, and the vertical leg 45 of this bracket is held in place by means of screws 46. The screw bracket is insulated from the housing 27 of the machine by means of an insulator 50, the screws 46 being also insulated by means of sleeves 51 and washers 52 of suitable insulating material. The bracket is thus supported by means of the screw 34 whereby the machine may be quickly adjusted to handle links of another size. The index bracket is formed at its rear side with a plate 55 which is arranged at right angles to the sleeve 22 of the bracket and which carries the operating parts of the index means, to be hereinafter described.

Our index means comprises an index drum 53 which is non-rotatably carried by the inner end 17 of the index shaft 16. The drum is provided on its outer face with four index rollers 54 which project from the frame of the drum and which are equidistantly spaced, thus providing for a 90° rotation of the shaft and feed wheel each time one of the rollers is actuated.

Carried by the plate 55 of the index bracket is an index lever 56. This lever is pivotally attached at its outer end to the plate 55 by means of a pivot pin 60. An index trip dog 61 is provided at the inner end of the index lever and this dog is pivotally attached to the lever by means of the pivot pin 62. Rotative movement of the dog on the downward stroke of the lever is prevented by the provision of coacting surfaces 63 formed on and between the lever and trip dog, so that when the lever is moved downwardly from the position shown in Fig. 1, the dog and lever will be held rigid and cause the actuation of the drum 53. When, however, the index lever is moved from its lowermost position to its uppermost position, the dog may rotate about its pivot 62 and may thus idly move past the two engaging rollers without actuating the drum. The trip dog is yieldably held in the position shown in Fig. 1 by means of a spring rod 64 which is slidably mounted within a spring box 65, formed with trunnions 66 and mounted for oscillation between upstanding arms 70. Within the box there is provided an index spring 71 which is mounted about the spring rod 64 and has its inner end bearing against the inner end of the spring box and its outer end against the washer 72 held in place upon the rod by means of adjusting nuts 73. The outer end of the rod is screwthreaded for the reception of the nuts 73. By these means the trip dog 61 is held in the position shown in Fig. 1 where the coacting surfaces 63 of the trip and the index lever will be held in engagement.

The index lever 56 of our invention is actuated preferably by hydraulic means, an index cylinder 74 being provided for this purpose. This cylinder is pivotally supported by a pin 75 carried by the plate 55, whereby the cylinder may oscillate to compensate for the angular movement of the index lever 56 as it is being operated. The piston rod 76 of the index cylinder extends upwardly and is attached to the index lever by means of a pivot pin 80.

Our invention includes means for locking the index drum in the position to which it has been operated by means of the index lever 56 and trip dog 61. These locking means comprise a lock bar 81 which is attached to and carried by the piston rod 82 of a lock cylinder 83. This cylinder is preferably arranged with its axis passing vertically through the centerline of the index shaft 16. The lock bar 81 is arranged substantially at right angles to the piston rod 82, and is of sufficient length to extend across and to engage the two lower rollers shown in Fig. 1. So as to retard any tendency of the index drum to spin or to be moved by inertia beyond a predetermined amount, we provide a brake 84 which comprises a brake bracket 85 rigidly secured to the plate 55 of the index bracket and a brake lever 86 which is pivotally attached by means of the pin 90 to the brake bracket. The brake lever is arranged opposite the index drum 53 and is provided on the face which contacts the periphery of the drum with a brake band or lining 91. The brake bracket is formed in its upper end with a recess 92 for the reception of one end of a brake spring 93, the other end of said spring fitting into a recess 94 formed in the brake lever. An adjusting button 95 is located at the base of the recess 92 and centralizes the outer end of the spring 93. An adjusting screw 96 is carried by the brake bracket for engagement with the adjusting button whereby the tension of the spring 93, and therefore the constantly applied tension of the brake upon the drum, may be adjusted.

The index cylinder 74 and the lock bar cylinder 83 are each provided with an inlet and outlet (not shown) for the passage of fluid under pressure used to actuate them. In the operation of these two cylinders both piston rods 76 and 82 are drawn downwardly simultaneously. When so operated the index trip dog 61, shown engaged with the upper righ-hand roller 54, will pull this roller downwardly causing the rotation of the drum, shaft, and feed wheel. The parts are so proportioned that when the drum has been rotated through substantially 90°, the outer end of the trip dog will move out of engagement with the roller with which it has just been operatively engaged. During the time of operation of the index lever 56 and trip dog 61, the lock bar 81 has been drawn downwardly away from the rollers 54, but upon return of the index lever 56 to its normal inoperative position by fluid pressure, shown in Fig. 1, the lock bar 81 will be elevated so as to engage the two lower rollers 54 as shown. Should the parts be out of alignment or should the operation be so rapid as to move the disc beyond the desired distance, the lock bar will serve to correct such inaccuracy of position by contacting the nearest roller and thus rotating the disc until the peripheries of both rollers lie in the same plane as the surface of the bar, whereby the correct positioning of the feed wheel will be assured. Not only does the lock bar 81 serve to assure the centralization of the disc and wheel but the wheel will be locked thereby in the welding position where it will be held until again released for subsequent operation of the wheel to a new position. When the index lever 56 and trip dog 61 are moved upwardly, the top side of the dog 61 will be brought into engagement with the rollers 54 and by contact therewith will be rotated counterclockwise about the pivot pin 62 and against the tension of the spring 71, until the end of the dog has moved beyond the point of contact of the upper roller 54 whereupon it will snap back to the position shown in Fig. 1 where the surfaces 63 of the dog and the lever will be in engagement and where the lever will again be ready for operation of the drum.

A cut-off index switch 100 is carried by a suitable bracket 101 fixed to the plate 55 and has its arm 102 in the path of travel of a stud 103 carried by the index lever. This stud is adjustable and serves to cut off the supply of fluid to the cylinders 74 and 83 at the end of the operating stroke, the pistons of the cylinders being returned to the positions shown in Fig. 1 by a reversal of the fluid from the upper ends of the cylinders to the lower ends thereof. This is brought about by the use of a solenoid-operated valve 115 shown in diagram in Fig. 1. This valve is connected to leads 116 and 117 which supply a source of electric current. The switch 100 is connected in lead 116 as shown. The solenoid valve is shown diagrammatically as having a supply pipe 118 for supplying fluid under pressure thereto. A pipe 119 extending from the valve is connected to the upper ends of both cylinders 74 and 83, and a separate pipe 120 extending from the valve is connected to the lower ends of the cylinders, whereby the fluid is supplied alternately to the opposite ends of the cylinders. The lock bar 81 is maintained in position by means of the fluid which is caused to exert its pressure constantly against the lower face of the piston (not shown) thereby urging the lock bar in engagement with the two contacted rollers 54. An index switch 104 is also provided and preferably carried by the brake bracket 85. The arm 105 of this switch is in the path of a switch dog 106 on the upward movement of the lock bar 81. This dog is carried by a trip dog holder 110 which is secured to the lock bar 81. A helical spring 111 connects the trip dog holder to an arm of the switch dog 106 whereby the same is maintained in the normal position shown in Fig. 1. On the down movement of the lock bar the trip dog will be rotated about its pivot point and will ride over the outer end of the switch arm 105 without causing its operation. The index switch 104 is for the purpose of operating in sequence other parts of the welding machine and does in itself not form part of this invention. These switches 100 and 104 as well as the solenoid valve 115 are standard articles of manufacture and since they in themselves do not form a part of this invention they are therefore not shown or described in detail.

Obviously, some modifications of the details herein shown and described may be made without departing from the spirit of our invention or the scope of the appended claims, and we do not, therefore, wish to be limited to the exact embodiment herein shown and described, the form shown being merely a preferred embodiment thereof.

Having thus described our invention, what we claim is:

1. Index means for the chain feed wheel of a chain welding machine, comprising a shaft carrying said feed wheel, a bracket for said shaft, an index drum carried by said shaft, equidistantly spaced index rollers carried by said drum, a hydraulically operated index lever pivotally carried by said bracket for engagement with said rollers, means for operating said index lever to rotate said wheel, hydraulically operated means coacting with said drum for locking said wheel in its operative position, and constantly-engaging drag means for frictionally holding said drum in said operative position.

2. Index means for the chain feed wheel of a chain welding machine, comprising a shaft carrying said feed wheel, a bracket for said shaft, an index drum carried by said shaft, index rollers carried by said drum and equidistantly spaced thereon, an index lever carried by said bracket and engageable with said rollers one at a time to rotate said wheel, a lock bar engageable with the two lower rollers, means for operating said index lever to rotate said wheel, means operable independently of said index lever for moving said lock bar toward and away from said lower rollers, and means for creating a constant drag on the drum for reducing the tendency toward free rotation of the wheel.

3. Index means for the chain feed wheel of a chain welding machine, comprising a shaft carrying said feed wheel, a bracket for said shaft, an index drum carried by said shaft, index rollers equidistantly spaced on said drum, an index lever pivotally carried by said bracket, a trip dog pivotally carried by said index lever and engageable with said rollers one at a time to rotate said wheel, said lever and said dog having coacting abutting surfaces engageable on the downward stroke of said lever, spring means carried by said bracket and connected to said trip dog for permitting relative rotation of said dog with said lever on the up stroke thereof without causing the operation of said drum, and hydraulic means for intermittently operating said index lever.

4. Index means for the chain feed wheel of a chain welding machine, comprising a shaft carrying said feed wheel, a bracket for said shaft, an index drum carried by said shaft, index rollers equidistantly spaced on said drum, an index lever pivotally carried by said bracket, a trip dog pivotally carried by said index lever and engageable with said rollers one at a time to rotate said wheel, said lever and said dog having coacting abutting surfaces engageable on the downward stroke of said lever, spring means carried by said bracket and connected to said trip dog for permitting relative rotation of said dog with said lever on the up stroke thereof without causing the operation of said drum, a lock bar movably mounted so as to be brought into engagement with the two adjacent rollers when said wheel is to be held in its operative position, hydraulic means for operating said index lever, and hydraulic means for operating said lock bar.

5. Index means for the chain feed wheel of a chain welding machine, comprising a shaft carrying said feed wheel, a bracket for said shaft, an index drum carried by said shaft, index rollers equidistantly spaced on said drum, an index lever pivotally carried by said bracket, a trip dog pivotally carried by said index lever and engageable with said rollers one at a time to rotate said wheel, said lever and said dog having coacting abutting surfaces engageable on the downward stroke of said lever, spring means carried by said bracket and connected to said trip dog for permitting relative rotation of said dog with said lever on the up stroke thereof without causing the operation of said drum, a lock bar movably mounted so as to be brought into engagement with the two adjacent rollers when said wheel is to be held in its operative position, hydraulic means for operating said index lever, hydraulic means for operating said lock bar, and brake means for frictionally holding said drum in the position to which it has been operated.

6. Index means for the feed wheel of a chain welding machine, comprising a shaft carrying said wheel, a bracket for said shaft, an index drum carried by said shaft, index rollers carried by said drum and equidistantly spaced thereon, an index lever carried by said bracket and engageable with said rollers one at a time to rotate said wheel, a lock bar engageable with the two adjacent rollers, means for operating said index lever to so rotate the wheel, and means for moving said lock bar toward and away from said lower rollers, whereby said wheel may be moved to and held in its operative position.

7. Index means for the feed wheel of a chain welding machine, comprising a shaft carrying said wheel, a bracket for said shaft, an index drum carried by said shaft, index rollers carried by said drum and equidistantly spaced thereon, an index lever carried by said bracket and engageable with said rollers one at a time to rotate said wheel, a lock bar engageable with the two adjacent rollers, means for operating said index lever to so rotate the wheel, means for moving said lock bar toward and away from said lower rollers, and means for frictionally holding said drum.

8. Index means for the feed wheel of a chain welding machine, comprising a shaft carrying said wheel, a bracket for said shaft, an index drum carried by said shaft, index rollers carried by said drum and equidistantly spaced thereon, an index lever carried by said bracket and engageable with said rollers one at a time to rotate said wheel, a lock bar engageable with two adjacent rollers of said drum, means for operating said index means to so rotate the wheel, and hydraulically-operated means for moving said lock bar toward and away from said adjacent rollers, said last-mentioned means serving to hold said lock bar in position against fluid pressure, whereby said wheel may be moved to and yieldably held in its operative position.

9. Index means for the feed wheel of a chain welding machine, comprising a shaft carrying said wheel, a bracket for said shaft, an index drum carried by said shaft, index rollers carried by said drum and equidistantly spaced thereon, an index lever carried by said bracket and engageable with said rollers one at a time to rotate said wheel, a lock bar engageable with two adjacent rollers of said drum, hydraulic means for operating said index lever to so rotate said wheel, means actuated by and during movement of the index lever for interrupting the fluid pressure to said hydraulic means, and means for moving said lock bar toward and away from said adjacent rollers, whereby said wheel may be moved to and held in its operative position.

10. Index means for the feed wheel of a chain welding machine, comprising a shaft carrying said wheel, a bracket for said shaft, an index drum carried by said shaft, index rollers carried by said drum and equidistantly spaced thereon, an index lever carried by said bracket and engageable with said rollers one at a time to rotate said wheel, a lock bar engaged with two adjacent rollers of said drum, hydraulic means for operating said index lever to so rotate said wheel, means actuated by and during the movement of the index lever for reversing the fluid pressure to said hydraulic means to restore the lever, and means for moving said lock bar toward and away from said adjacent rollers, whereby said wheel may be moved to and held in its operative position.

11. Index means for the feed wheel of a chain welding machine, comprising a shaft carrying said feed wheel, a bracket for said shaft, an index drum carried by said shaft, index rollers carried by said drum and equidistantly spaced thereon, an index lever carried by said bracket and engageable with said rollers one at a time to rotate said wheel, a lock bar engageable with two adjacent rollers of said drum, means for operating said index lever in one direction to so move the wheel, means operable by and during such movement of said lever to reverse the direction of movement of said operating means to restore the index lever, and means for moving said lock bar toward and away from said adjacent rollers, whereby said wheel may be moved to and held in operative position.

OTTO W. WINTER.
CHARLES W. MIDDLESTEAD.